(12) United States Patent
Fabiyi et al.

(10) Patent No.: US 7,455,776 B2
(45) Date of Patent: Nov. 25, 2008

(54) METHOD FOR MIXING HIGH VISCOUS LIQUIDS WITH GAS

(75) Inventors: Malcolm Ezekiel Fabiyi, Lagrange Park, IL (US); Richard A Novak, Naperville, IL (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 11/602,519

(22) Filed: Nov. 21, 2006

(65) Prior Publication Data

US 2008/0118946 A1    May 22, 2008

(51) Int. Cl.
C02F 3/00    (2006.01)
(52) U.S. Cl. .................................... 210/620; 210/629
(58) Field of Classification Search ............... 210/620, 210/629
See application file for complete search history.

(56) References Cited

U.S. PATENT DOCUMENTS

| | | | |
|---|---|---|---|
| 4,256,839 A | 3/1981 | Solomons et al. | |
| 4,454,077 A | 6/1984 | Litz | |
| 4,919,849 A | 4/1990 | Litz et al. | |
| 5,451,348 A | 9/1995 | Kingsley | |
| 5,916,491 A | 6/1999 | Hills | |
| 5,925,290 A | 7/1999 | Hills | |
| 6,123,446 A | 9/2000 | Schuchardt | |
| 6,135,430 A | 10/2000 | Bergman, Jr. et al. | |
| 6,145,815 A | 11/2000 | Cheng et al. | |
| 6,245,237 B1 | 6/2001 | Blough et al. | |
| 6,461,500 B1 * | 10/2002 | Hoage et al. | 210/150 |
| 6,464,384 B2 | 10/2002 | Kubera et al. | |
| 6,761,797 B2 | 7/2004 | Kohlgruber et al. | |
| 6,863,817 B2 * | 3/2005 | Liu et al. | 210/605 |

FOREIGN PATENT DOCUMENTS

JP    1258732    10/1989

* cited by examiner

Primary Examiner—Chester T Barry
(74) Attorney, Agent, or Firm—Robert J. Hampsch

(57) ABSTRACT

A system and method for mixing high viscous liquids with gas is provided. The disclosed embodiments include a reactor or mixing vessel having a draft tube disposed therein, a gas injection subsystem adapted to inject gas into the reactor or mixing vessel proximate the entrance of the draft tube. The embodiments also include an agitator disposed within the draft tube which makes the draft tube the primary site for the gas-liquid mixing. In particular, the agitator is adapted to create gas bubbles having an average diameter between about 0.3 mm and 3.0 mm which are then ejected into the reactor or mixing vessel. The mass transfer efficiency associated with the present system and method is enhanced from the combined effect of gas dissolution into the high viscous liquid within the draft tube and greater bubble residence time within the high viscous liquid.

11 Claims, 3 Drawing Sheets

METHOD FOR MIXING HIGH VISCOUS LIQUIDS WITH GAS

CROSS REFERENCE TO RELATED APPLICATIONS

None

FIELD OF THE INVENTION

The present invention relates to gas-liquid mixing operations, and more particularly, to a system and method for effecting high mass transfer of a gas to high viscous liquids.

BACKGROUND

There exist a wide variety of techniques and systems that are known in the art for achieving the mixing or reactions of liquids with gases. In some cases, a simple bubble column is employed, with the injected gas rising up through the body of liquid in the tank. Upon injection, the oxygen, hydrogen, or other reactive gas either reacts directly when in bubble form, or dissolves in the liquid and then reacts, or both.

Stirred Tank Reactors (STR) are also commonly employed to enhance the gas-liquid mixing process. In an STR system, gas is normally fed to a sparger at the bottom of a vessel and a flat-bladed Rushton turbine or other such mechanical agitator is used to shear the gas for improved dispersion in the liquid phase. In addition, axial flow impellers are commonly employed in STR systems to facilitate gas dissolution.

In other gas-liquid mixing operations a down-pumping impeller positioned within a hollow draft tube in a mixing vessel is used to create a recirculation flow pattern of the liquid contained in the vessel. Because of such recirculation of the liquid downward in the hollow draft tube and upward in the vessel outside the draft tube, vortices are formed in the upper inlet area of the draft tube so as to draw feed gas from an overhead gas space within the vessel into the recirculating liquid passing downward into draft tube.

In many gas-liquid mixing applications, particularly those in the specialty chemical and pharmaceutical areas, the viscosity of the solutions tend to be higher than that of clean water and may tend to vary over time. In particular, mixing processes in the specialty chemical and pharmaceutical areas are often done under conditions of medium to high viscosity of the solution caused usually by the inclusion of solids in liquid flow (e.g. slurries), or by certain chemical characteristics of the liquids that cause exhibition of non-Newtonian fluid characteristics.

Prior art solutions to liquid-gas mixing for highly viscous solutions include the use of a plurality of mixers, nozzles or orifices to better disperse the gas within the viscous liquid, or alternatively, the forced circulation of the liquid in atomizers and spray nozzles. Disadvantageously, the additional equipment and process steps used in the mixing of highly viscous solutions often translate to consumption of larger amounts of energy. In addition, the inclusion of additional mixers, nozzles, atomizers, etc. may increase the footprint of the underlying process system as well as increase the capital and operating costs associated with the mixing process.

SUMMARY OF THE INVENTION

In one aspect, the present invention may be characterized as a method of mixing high viscous liquid with gas comprising the steps of: (a) disposing a high viscous liquid within a mixing vessel to define a liquid portion of the vessel and a gas headspace portion of the vessel; (b) introducing gas into the vessel at a location proximate the agitator; (c) agitating the high viscous liquid and gas to produce gas bubbles within the high viscous liquid, the gas bubbles having an average diameter of between about 0.3 mm and 3.0 mm; and (d) dispersing the high viscous liquid including the gas bubbles away from the hydrodynamic structure and within the mixing vessel to increase residency time of the gas bubbles within the mixing vessel.

In another aspect, the present invention may be characterized as a method of treating high-solid content liquid in an aeration basin wastewater system, the basin having a hydrodynamic structure, such as a draft tube, in operative association with an agitator disposed therein. The method comprises the steps of: (a) disposing the high-solid content liquid within the aeration basin; (b) introducing oxygen into the basin at a location proximate to agitator; (c) agitating the high-solids content liquid and oxygen to produce gas bubbles within the high-solids content liquid proximate the hydrodynamic structure, the gas bubbles having an average diameter of between about 0.3 mm and 3.0 mm; and (d) ejecting the high-solid content liquid including the gas bubbles away from the hydrodynamic structure into the aeration basin to disperse the gas bubbles within the aeration basin and increase residency time of the gas bubbles within the aeration basin.

The mass transfer efficiency associated with the present methods is enhanced or greater as a result of the combined effect of the bubble size, the gas dissolution into the high viscous liquid near the agitator and greater bubble residence time of the gas bubbles within the high viscous liquid in the reactor, vessel, or basin.

Finally, the invention may also be characterized as a system for mixing a high viscous liquid with a gas comprising: a reactor adapted for containing a high viscous liquid; a hydrodynamic structure disposed within the reactor; a gas injection subsystem disposed in operative association with the reactor and adapted to inject a source of gas into the reactor at a location proximate the entrance of the hydrodynamic structure; an agitator or impeller disposed within the vessel and in operative association with the hydrodynamic structure, the agitator or impeller further adapted for creating gas bubbles having an average diameter of between about 0.3 mm and 3.0 mm and the agitator or impeller is further adapted for dispersing the high viscous liquid and gas bubbles within the reactor and increase residency time of the gas bubbles within the reactor.

BRIEF DESCRIPTION OF THE DRAWINGS

The above and other aspects, features, and advantages of the present invention will be more apparent from the following, more descriptive description thereof, presented in conjunction with the following drawings, wherein.

DETAILED DESCRIPTION

Figure 1:
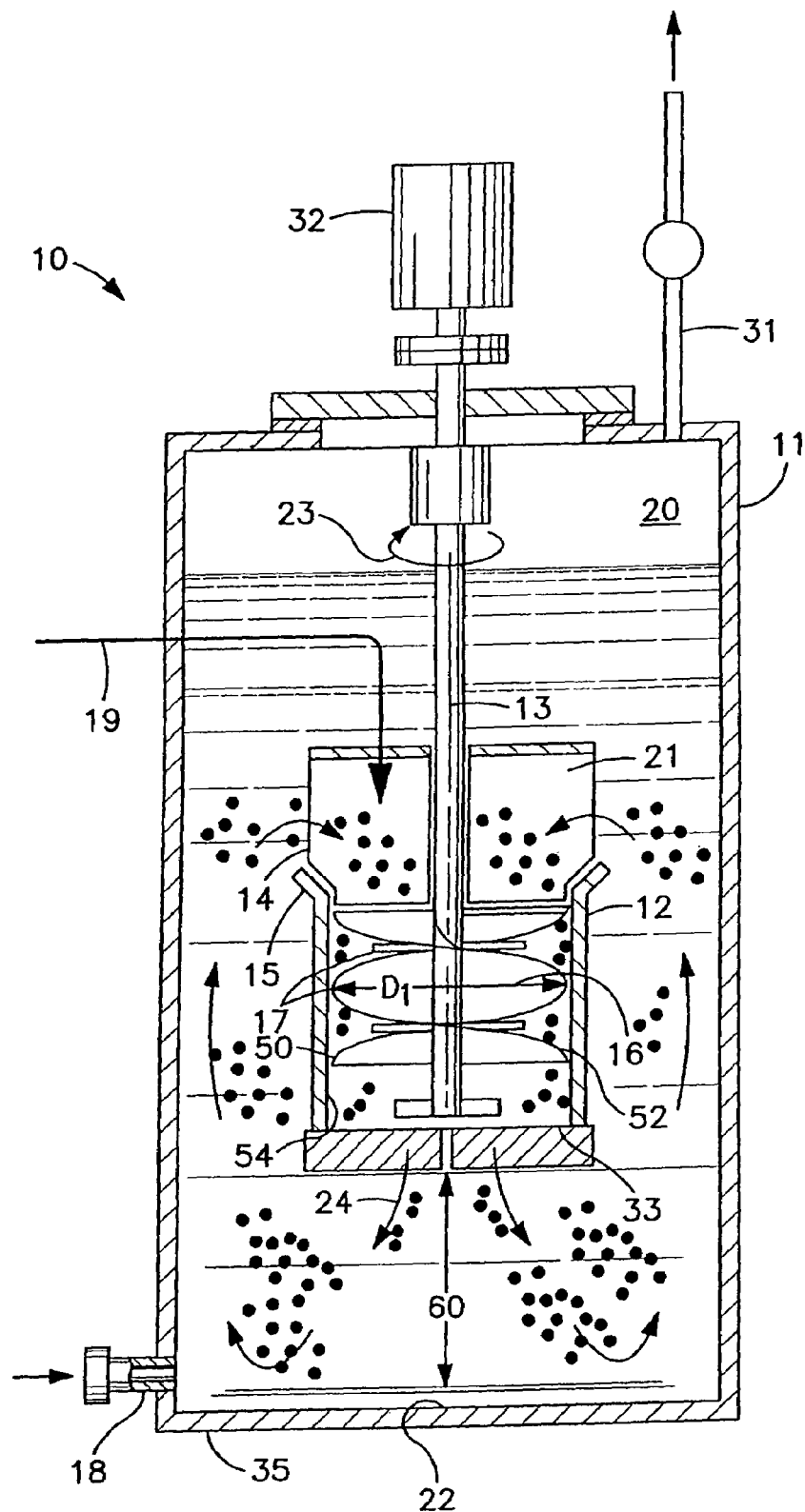
FIG. 1 is a schematic view of a gas-liquid mixing system in accordance with the present invention applied to a closed vessel system.

Referring to FIG. 1, the present system 10 includes a vessel 11 or suitable container having a draft tube 12 vertically disposed therein. The vessel 11 is closed or sealed to contain the working gas within the overhead space 20. The draft tube 12 extends from above the upper end of a helical impeller 16 to a point substantially above the floor 22 of vessel 11, thus providing adequate room for liquid circulation. The top portion or entrance of draft tube 12 comprises a flared conical inlet 15, the outside wall of which forms an obtuse angle of about 145 to about 175 degrees with the outside wall of draft tube 12. From about two to eight vertical inlet guide baffles 14 are disposed proximate the conical inlet 15 above the entrance to the draft tube 12. Preferably, the baffles 14 are thin sheets of structurally rigid material equilaterally spaced and symmetrically positioned around entrance to the draft tube 12. The helical impeller 16 comprises one or more blades 17 affixed to the impeller shaft 13 for rotation with the impeller shaft 13 by motor 32.

During operation, at least a minimum liquid level is preferably maintained above conical inlet 15. Suitable liquid inlets 18, gas inlets 19, and an upper pressure relief vent 31 are provided, as well as structural support for vessel 11 and draft tube 12. A motor 32 is provided at the top of the vessel 11 to drive the impeller shaft 13 in the clockwise direction of arrow 23, and in turn move the liquid and gas within the draft tube 12 in a downward direction of arrow 24. The working gas is preferably introduced under pressure through the gas inlet conduit 19 which discharges the gas to the overhead space or proximate the entrance of the draft tube 12. Typical gas pressures are in the range of about 0.1 psig (pounds per square inch gauge) to about 2000 psig and typical gas flow rates are in the range of about 1 scfm (standard cubic feet per minute) to about 1000 scfm. The liquid is introduced, and eventually withdrawn, at liquid inlet 18, near the base 35 of vessel 11. Typical liquid flow rates are in the range that provide for hydraulic retention times ranging from 10 seconds to as much as 10 hours or more in the vessel 11.

The helical impeller 16 is positioned within the draft tube 12 in a manner that permits liquid to be drawn in at the entrance of the draft tube 12 and discharged at the exit of the draft tube 12. In some arrangements, the rotating action of the impeller 16 causes the generation of a vortex of liquid that facilitates gas ingestion from the overhead space 20. In other arrangements where the impeller is sufficiently submerged within the liquid, there is no vortex of liquid formed and the gas ingestion is preferably accomplished via a direct injection of the gas into the liquid proximate the impeller and to a agitation region.

Intimate gas-liquid contacting occurs in the draft tube 12 at or near the impeller 16. A continuous supply of the gas is preferably introduced to the vessel 11 through the gas inlet conduit 19 directly into the liquid at or near the entrance of the draft tube 12 and proximate the impeller 16. Alternatively, any type of hydrodynamic enclosure or structure disposed in the vessel can be used in lieu of the draft tube 12. Such similar hydrodynamic enclosures should be adapted to spatially define the area of intimate gas-liquid contacting.

The rate of gas ingestion in the illustrated embodiments can be controlled by direct adjustment of the injection rate of the gas or the speed of the impeller 16 to optimize processing conditions over variations in the viscosity and solids content of the solution within the vessel 11.

Bulk mixing of the solution is effected in the vessel 11 by the dispersion action of the liquid jet stream as it exits the draft tube 12 and is directed to the floor 22 of the vessel 11. Undissolved gases in the jet stream disengage from the jet stream at a critical velocity that corresponds to the average buoyancy velocity of the gas bubbles at the given process conditions. As the viscosity of the solution increases, the depth of this disengagement zone 60 extends further from the distal end or exit 33 of the draft tube 12 to the floor 22 of the vessel 11. The extension of the disengagement zone 60 is attributable to the reduced diameters of the gas bubbles as well as the increased viscous drag on the gas bubbles. Together, these result in an increase in the gas bubble residence time within the vessel 11 and improved dissolving of the gas bubbles in the liquid, as well as the overall gas utilization and the mass transfer efficiency associated with the gas-liquid mixing process.

Referring again to FIG. 1, recirculation of the liquid occurs as a result of the mechanical agitation within the draft tube and the corresponding downward force of the liquid in the draft tube or similar hydrodynamic structure. As the liquid with gas bubbles is ejected from the bottom of the draft tube, a suitable volume of replacement liquid having some mass of gas is ingested near the top of the draft tube proximate the conical inlet. As illustrated in FIG. 1, it is advantageous that the recirculation of the liquid into the draft tube occur below the top surface of the liquid in the vessel. In this manner fewer of the gas bubbles entrained within the liquid will release to the overhead space and more of the gas bubbles entrained within the liquid will be recirculated into the draft tube further improving the gas-liquid mixing and associated mass transfer. The recirculation scheme also provides continuous mixing of the liquid and gas within the vessel in support of the intended reactions occurring within the vessel.

In the preferred embodiments, the impeller 16 is disposed at least partially within the draft tube 12 and defines a radial clearance 50 between the tip 52 of the impeller 16 and the interior wall 54 of draft tube 12 or similar hydrodynamic structure. In a preferred embodiment of the disclosed system 10, the radial clearance 50 is less than or equal to one-half the impeller diameter ($D_i$) and more preferably the radial clearance will be less than 10% of the impeller diameter ($D_i$). When used with high viscous solutions, this closer arrangement of the impeller 16 with the interior wall 54 of the draft tube 12 tends to impart higher shear forces to the liquids and gases in or near the impeller region and thereby achieves optimal bubble size distribution. As explained below, the optimized bubble size distribution of the gas within the liquid enhances the mass transfer efficiency of the mixing process.

The preferable flow orientation of the draft tube 12 and impeller 16 achieves a vertically downward flow 24 of liquid and gas (i.e. downflow), so as to maximize the increase in gas bubble residence time within the vessel. However, the invention can also be beneficially practiced using other orientations including inline flow orientations, horizontal flow orientations, angular flow orientations (upflow and downflow), and vertical upflow orientations. Recirculation pumps, ejectors and other auxiliary devices can also be incorporated, as required within the present system.

Figure 2:
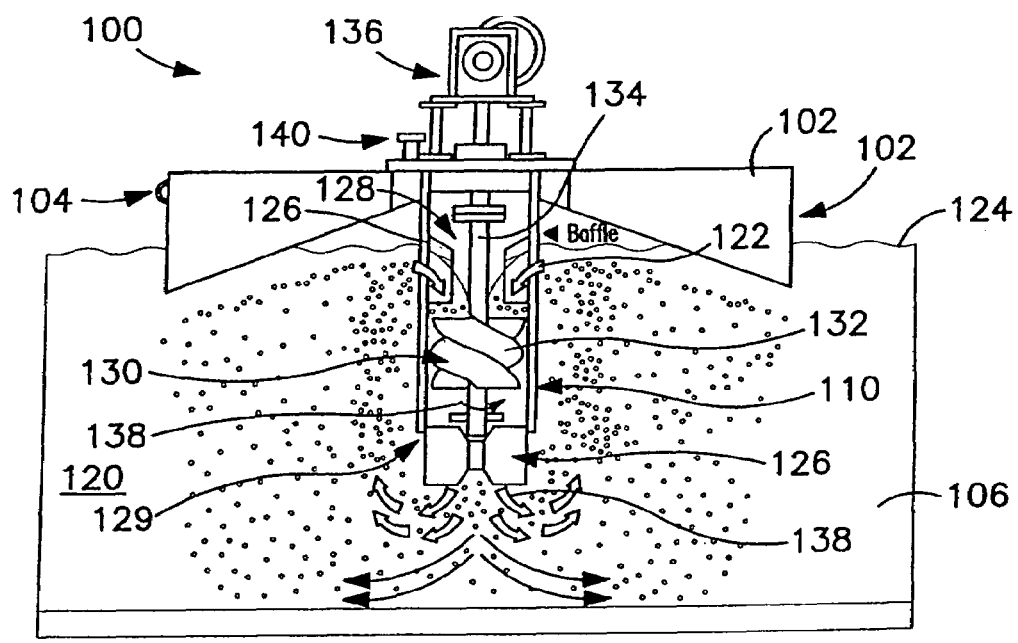
FIG. 2 is a schematic view of the present gas-liquid mixing system applied to an aeration basin in a wastewater treatment system.

Turning now to FIG. 2, there is shown an embodiment of the invention applied to an aeration basin of a wastewater treatment system 100. As seen therein, the system includes a float assembly 102 having an anchor ring 104 which is placed in an aeration basin 106 of a wastewater treatment system 100. In the present application, the liquid within the aeration basin 106 is a high solid content liquid 120, typically on the order of greater than 10 grams per liter solids content. Extending in a downward orientation from the float assembly 102 is a draft tube 110. The draft tube 110 preferably has circumferential openings 122 located below the top surface 124 of the high-solids content liquid 120 in the aeration basin 106. Baffles 126 are equilaterally spaced and symmetrically positioned around the openings 122 which are proximate to the entrance 128 to the draft tube 110. Additional baffles 126 can be located proximate the exit 129 of the draft tube 110. A helical impeller 130 is disposed within the draft tube 100 and generally comprises one or more blades 132 that are affixed to the impeller shaft 134 for rotation with the impeller shaft 134 by motor 136, which is preferably placed on top of the float assembly 102.

The motor is adapted to drive the impeller shaft 134 in the counterclockwise direction of arrow 138, and in turn move the liquid and gas within the draft tube 110 in a downward direction of arrow 136. The oxygen gas is preferably introduced through the gas inlet 140 which discharges the oxygen gas proximate the entrance 128 of the draft tube 110. Recirculation of the high solids content liquid 120 occurs as a result of a mechanical agitation within the draft tube 110 and the corresponding downward force of the high solids content liquid 120 in the draft tube 110. As the liquid with gas bubbles is ejected from the exit 129 of the draft tube 110, a suitable volume of replacement liquid 120 having some mass of gas is ingested through openings 122 near the entrance 128 of draft tube 110.

As discussed above with reference to FIG. 1, the impeller 130 defines a radial clearance between the tip of the impeller blade and the interior wall of draft tube 110. Preferably, the radial clearance is less than or equal to one-half the impeller diameter and more preferably the radial clearance will be less than 10% of the impeller diameter. When used with high-solid content liquids in a wastewater application, the close arrangement of the impeller 130 with the interior wall of the draft tube 110 or other hydrodynamic structure tends to impart higher shear forces to achieve the optimal bubble size distribution, namely 0.3 mm to 3.0 mm. As explained below, the optimized bubble size distribution of the oxygen within the high solids content liquid enhances the mass transfer efficiency of the mixing process.

There are usually significant differences in the effectiveness of gas-liquid transfer in any mixing system as the viscosity of the liquid changes. In conventional gas-liquid mixing systems, it is generally understood by those skilled in the art that mass transfer efficacy is inversely proportional to the viscosity of the solution. One of the primary factors responsible for the lower mass transfer efficacy in conventional mixing systems is believed to be the effect of the viscosity of the solution on the gas bubble size distribution. Also, the decrease in mass transfer efficacy in conventional gas-fluid mixing systems as the viscosity of the solution increases is typically more pronounced at higher gas and liquid flow rates.

In wastewater treatment processes, the impact of viscosity of the solution on the efficacy of the mass transfer process can be tracked using various parametric measures. In particular, the Standard Oxygen Transfer Rate (SOTR) is ascertained by performing standardized aeration tests using clean water under specified test conditions, namely 20° C., zero dissolved oxygen and a pressure of 760 mm Mercury. Mass transfer rates obtained in field test conditions other than the SOTR specific test conditions are referred to as Actual Oxygen Transfer Rate (AOTR).

It is known that as the viscosity of the wastewater increases, either due to an increase in the solids levels in the wastewater or due to an increase in the viscous components of the waste stream, the Actual Oxygen Transfer Rate, or AOTR using conventional wastewater aeration schemes falls to a value lower than the empirically determined SOTR. The variation in the AOTR and the SOTR are generally due to differences in the mass transfer coefficient, ($K_L a$) between the standard or controlled process conditions and the actual process conditions. The ratio of the mass transfer coefficient in actual conditions to the mass transfer coefficient in standard conditions is given by a parameter known as the alpha factor ($\alpha$), where:

$$\alpha = \frac{K_L a(\text{Actual system})}{K_L a(\text{Clean water})}$$

The relationship between the mass transfer coefficient, $K_L a$, and the Actual Oxygen Transfer Rate is generally represented by the following equation:

$$AOTR = SOTR \left( \frac{\beta C_{\overline{S},T,H} - C_L}{C_{s,20}} \right)(1.024^{T-20})(\alpha)(F)$$

Where $\beta$ is the salinity-surface tension correction factor, F is the fouling factor, and $C_{\overline{S},T,H}$ is the average dissolved oxygen concentration in clean water in an aeration or reactor tank at temperature T (° C.), and altitude H (m). Where all other variables stay constant, the alpha factor provides a measure for the ratio of the AOTR and the SOTR.

All tests were conducted in a 200 gallon acrylic test vessel using test samples of about 600 liters of carboxyl methyl cellulose (CMC) solution. CMC was used as the test solution for approximating activated sludge solutions of various viscosities. A conversion chart was established for transforming viscosity measurements of the CMC solution to those of activated sludge equivalents. Activated sludge from an industrial wastewater treatment facility that processes guar was utilized for creating the CMC to sludge conversion chart and determining the relationship between the viscosity and the concentration of solids in the wastewater solution.

In the various test runs, a Mechanically Agitated Contactor (MAC) system consisting of a 3" impeller disposed in a 3.3" internal diameter draft tube and driven by a 1.5 HP DC motor was used. A source of oxygen was introduced into the test vessel proximate the entrance of the draft tube. The mechanically agitated contactor test results were then compared to test results obtained using (i) a 6×20 µm 6" disc spargers and (ii) 3×150 µm commercial Fine Bubble Diffused Air Spargers attached to a source of compressed air and placed in the test vessel.

Figure 3:
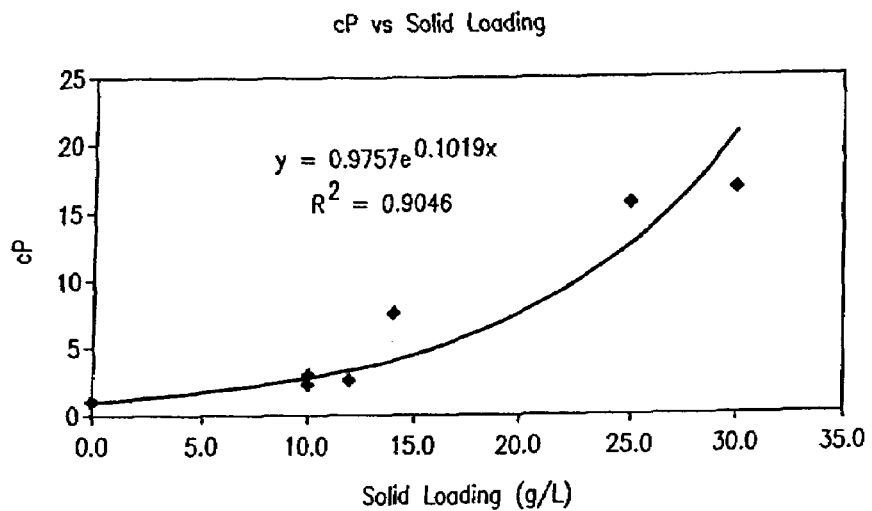
FIG. 3 is a graphical representation of the effect of solids concentration on the viscosity of activated sludge in a wastewater treatment process.

FIG. 3 graphically depicts the effect of solids concentration on the viscosity of activated sludge. In the present graph, the viscosity of the activated sludge rises as the accumulation of solids increases. In particular, the data in FIG. 3, shows an exponential relationship between the apparent viscosity of activated sludge and the concentration of solids within the sludge. For the illustrated graph, the exponential relationship is characterized as:

$$y = 0.9757 e^{0.1019x}$$

where 'y' is apparent viscosity in centipoise and 'x' is the solids concentration or equivalent Mixed Liquor Suspended Solids (MLSS) concentration of the activated sludge in grams per liter.

Figure 4:
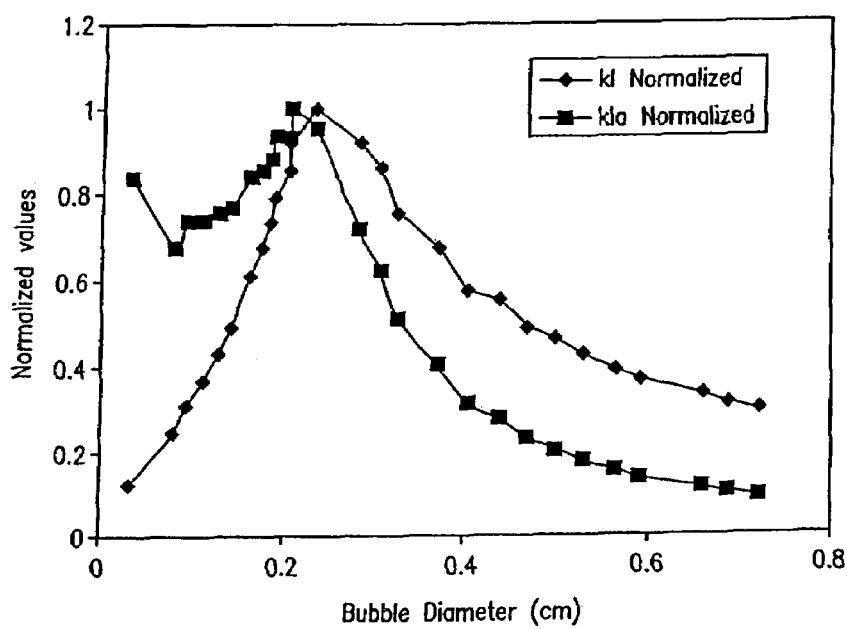
FIG. 4 is a graphical representation of the correlation between the average gas bubble size and the mass transfer coefficient in a gas-liquid mixing system.

Turning now to FIG. 4, there is shown a graphical representation of the correlation between the average gas bubble size and the mass transfer coefficient. As seen therein, the overall mass transfer coefficient is impacted significantly by the average gas bubble diameter. It is therefore conceivable that the mass transfer could be optimized in a system where the gas bubble diameter ($d_b$) is modified either by coalescence or breakup to fall within the optimum range of between about 0.3 mm to about 3.0 mm in diameter. Modification of the gas bubble diameter is achieved in the presently disclosed systems and method by control of the gas delivery mode and design and operating characteristics of the impeller.

Figure 5:
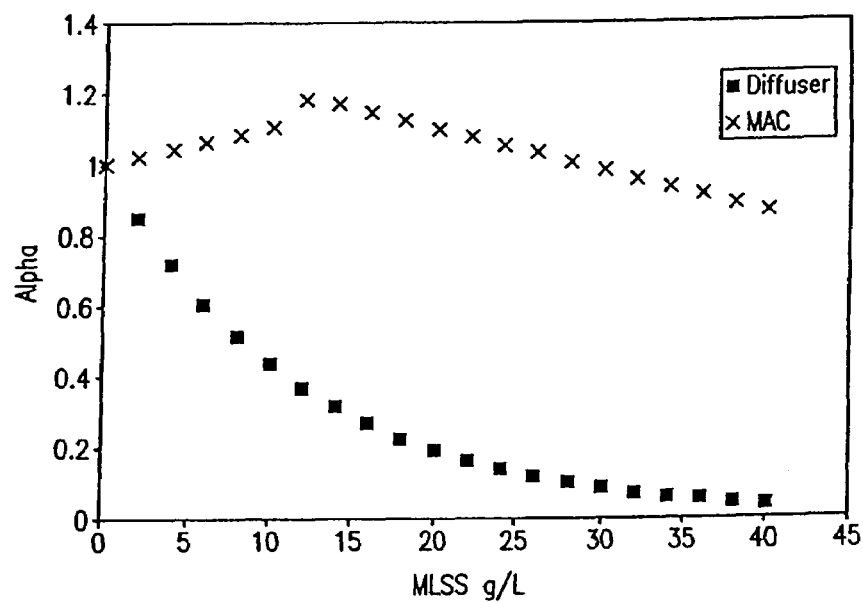
FIG. 5 is a graphical representation comparing the alpha factors for conventional fine bubble diffuser systems and the mechanically agitated contactor system of the kind embodied in the present invention.

Table 1 provides a summary of the results for the mass transfer tests conducted to compare the mechanically agitated contactor system of the present invention to conventional fine bubble diffuser based gas-liquid mixing systems. As seen in Table 1 and associated FIG. 5, the present system and method for enhanced gas-liquid mixing exhibits an alpha factor trend that is substantially different than those exhibited using conventional diffused air mixing systems. The test results have also identified a range of conditions where the alpha factor associated with the mechanically agitated contactor system is greater than 1.0. This suggests that the mass transfer efficacy on the treatment of wastewater using the Mechanically Agitated Contactor (MAC) system and the direct injection of oxygen exceeds the mass transfer efficacy of the conventional diffused air mixing systems in nearly all cases and is in some cases better than the mass transfer efficacy of the mechanically agitated contactor system using clean water. These results will translate to a greatly reduced aeration power requirement to achieve the targeted oxygenation and permits the wastewater treatment system to be operated at higher solids loading. In practice this means a reduction in operating costs, fewer solid waste problems, more flexibility for existing wastewater treatment systems, and enables the construction of smaller footprint wastewater treatment systems.

In addition, it appears that for wastewater systems having solids concentration of about 1 to about 10 g/L, the mass transfer coefficients associated with oxygen injection and Mechanically Agitated Contactor (MAC) system of the present invention generally increased with corresponding increase in solids concentration. However, as evidenced from the aforementioned tests, when the solids concentration in the solution or MLSS equivalent rose above 10 g/L, the mass transfer coefficients associated with the mechanically agitated contactor system generally decreased as the solids concentration increased.

TABLE 1

Mass Transfer Test Data

| Viscosity (cP) | MLSS (g/l) | Alpha Factor ($\alpha$) Diffuser System | Alpha Factor ($\alpha$) MAC System |
|---|---|---|---|
| 1.0 | 0 | 1 | 1 |
| 1.2 | 2 | 0.85 | 1.02 |
| 1.5 | 4 | 0.72 | 1.04 |
| 1.8 | 6 | 0.61 | 1.06 |
| 2.2 | 8 | 0.51 | 1.08 |
| 2.7 | 10 | 0.44 | 1.10 |
| 3.3 | 12 | 0.37 | 1.18 |
| 4.1 | 14 | 0.31 | 1.17 |
| 5.0 | 16 | 0.27 | 1.15 |
| 6.1 | 18 | 0.22 | 1.12 |
| 7.5 | 20 | 0.19 | 1.10 |
| 9.2 | 22 | 0.16 | 1.08 |
| 11.3 | 24 | 0.14 | 1.05 |
| 13.8 | 26 | 0.12 | 1.03 |
| 16.9 | 28 | 0.10 | 1.01 |
| 20.7 | 30 | 0.08 | 0.98 |
| 25.4 | 32 | 0.07 | 0.96 |
| 31.2 | 34 | 0.06 | 0.94 |
| 38.2 | 36 | 0.05 | 0.91 |
| 46.9 | 38 | 0.04 | 0.89 |
| 57.5 | 40 | 0.04 | 0.87 |

For the diffused air system, the data in Table 1 when considered in conjunction with FIG. 4 indicates that the gas bubble diameters were larger than 2 mm or 3 mm at typical solids concentration levels or equivalent MLSS levels of greater than about 10 g/L. As described above with reference to FIG. 4, a gas bubble diameter of greater than about 2 mm or 3 mm contributes to the lower mass transfer efficacy in such conventional gas-liquid mixing systems. Keep in mind that the viscosity of the wastewater solution and the solids concentration in the wastewater solution are closely related (See FIG. 3).

Conversely, using a mechanically agitated contactor system as embodied in the present system, within certain limits, defined from 1-12 g/L of solids in the case of wastewater, the bubble diameter generally decreases as the viscosity of the solution increases resulting in superior mass transfer characteristics compared to conventional fine bubble diffuser systems.

It was also observed during tests of the present mechanically agitated contactor system, that the depth to which the bubble plume descends prior to disengagement from the jet stream was greater as the viscosity of the wastewater solution increases. The buoyant velocity of the gas bubble is known to be impacted by the drag force imparted on the gas bubble the solution. The drag force imparted on the gas bubble is, in turn, a function of the viscosity of the solution. Therefore, with increases in the viscosity of the wastewater solution, the drag force on the gas bubble increases, causing the bubbles to be retained in the jet stream. The jet stream and the entrained gas bubble plume generally descends lower into the vessel resulting in a longer gas bubble entrainment in the jet stream ejected from the draft tube, which further contributes to the improved mass transfer efficiency of the mechanically agitated contactor system.

While the invention herein disclosed has been described by means of specific embodiments and processes associated therewith, numerous modifications and variations can be made thereto by those skilled in the art without departing from the scope of the invention as set forth in the claims or sacrificing all its material advantages.

For example, the impeller or agitator provided in the disclosed embodiments can be of various configurations or impeller types including an axial flow fan turbine, axial flow pitched blade, axial flow propeller, screw centrifugal, open radial vane, semi open radial vane, closed radial vane, radial flow anchor, radial flow paddle, radial flow turbine, or other unspecified type of impeller. In addition, the disclosed system could be configured to utilize a plurality of mechanically agitated contactors within the vessel each having an impeller encased within a draft tube. The plurality of mechanically agitated contactors may be evenly distributed within the vessel or may be oriented in a stacked configuration. The stacked configuration is particularly useful in applications where the liquid level varies significantly during the process.

Preferably, the presently disclosed system and process is most advantageous when used in a gas-liquid mixing process where the viscosity of the solution exceeds about 10 centipoise, and more preferably where the viscosity of the solution is between 10 and 100 centipoise. The introduced gases can be selected from oxygen, nitrogen, ozone-enriched gas, air, hydrogen, carbon dioxide, argon, or any combination thereof, or any other gases used in industrial gas-liquid mixing processes.

INDUSTRIAL APPLICABILITY

In utilizing the presently disclosed systems and methods for enhanced gas-liquid mixing in high viscous solutions, the presently disclosed methods allow for more efficient gas liquid contacting and superior mass transfer characteristics within the vessel as a result of the larger total surface area of the ingested gas and the increased gas bubble residence time within the vessel.

When compared to the prior art gas-liquid mixing systems and methods, the superior mass transfer properties obtained using the presently disclosed systems and methods translates to use of less mixing equipment, potentially smaller footprint and substantially less time and energy to achieve the same level of gas-liquid mixing.

Application of the present invention to a membrane bioreactor system employed as part of a wastewater treatment process yields several notable advantages. Such advantages include the ability to operate the membrane bioreactor system at significantly higher biomass concentrations, use of less aeration power to achieve the desired oxygenation levels, increased cell residence time, and overall reduction of waste sludge production.

In addition, the presently disclosed systems and methods allow gas-liquid mixing operations at higher viscosity levels without the need for additional equipment, energy and the associated costs. This enhanced gas-liquid mixing capacity would be useful in applications that have been heretofore constrained by the efficiency of the gas-liquid mixing process or that would benefit economically from operation at high solids or high viscosity levels. Such processes might include, for example, fermentation processes or chemical processes having higher reactant or product concentrations; and, as described above, wastewater treatment processes having higher solids concentration.

The above-identified methods and systems for enhanced gas-liquid mixing of high viscous liquids can be utilized alone or in conjunction with other gas-liquid mixing techniques. Moreover, each of the specific steps involved in the preferred process, described herein, and each of the components in the preferred systems are easily modified or tailored to meet the peculiar design and operational requirements of the particular application in which it is used.

What is claimed is:

1. A method of treating high-solids content liquid in an open aeration basin of a wastewater system, the aeration basin having a draft tube disposed therein, the draft tube having an entrance, an exit and a passageway where an agitator is disposed and through which the high-solids content liquid flows in a downward orientation, the method comprising the steps of:

disposing the high-solids content liquid within the aeration basin;

introducing oxygen into the open aeration basin at a location proximate to the draft tube;

agitating the high-solids content liquid and oxygen to produce gas bubbles within the high-solids content liquid within the draft tube, the gas bubbles having an average diameter of between about 0.3 mm and 3.0 mm; and ejecting the high-solid content liquid including the gas bubbles from the exit of the draft tube into the aeration basin to disperse the gas bubbles within the open aeration basin and increase residency time of the gas bubbles within the open aeration basin.

2. The method of claim 1 wherein the high-solids content liquid has a solids loading of greater than about 10 grams per liter.

3. The method of claim 2 wherein the high-solids content liquid has a solids loading of between about 10 grams per liter and 40 grams per liter.

4. The method of claim 2 wherein the wastewater system is a membrane bioreactor wastewater system.

5. A method of mixing a high viscous liquid with a gas within a mixing vessel, the mixing vessel having a draft tube disposed therein, the draft tube having an entrance, an exit and a passageway where an agitator is disposed and through which the high viscous liquid flows in a downward orientation, the method comprising the steps of:

disposing the high viscous liquid within the mixing vessel to define a liquid portion of the vessel and a gas headspace portion of the vessel with the draft tube submersed in the liquid portion;

introducing gas into the vessel at a location proximate the draft tube;

agitating the high viscous liquid and gas to produce gas bubbles within the high viscous liquid, the gas bubbles having an average diameter of between about 0.3 mm and 3.0 mm; and dispersing the high viscous liquid including the gas bubbles away from the exit of the draft tube into the mixing vessel to increase residency time of the gas bubbles within the mixing vessel.

6. The method of claim 5 wherein the gas is oxygen.

7. The method of claim 5 wherein the high viscosity liquid has a viscosity of greater than about 2 centipoise.

8. The method of claim 5 wherein the high viscosity liquid has a solids loading of greater than about 10 grams per liter.

9. The method of claim 5 wherein the vessel is an open aeration basin of a wastewater treatment system and the wastewater has a solids loading of between about 10 grams per liter and 40 grams per liter.

10. The method of claim 5 wherein the vessel is a fermentation vessel and the high viscosity liquid is a fermentation broth having a solids loading of between about 5 grams per liter and about 70 grams per liter.

11. The method of claim 5 wherein the vessel is a chemical reactor or bio-reactor and the high viscosity liquid has a viscosity of having a viscosity of greater than about 10 centipoise.

\* \* \* \* \*